United States Patent Office 3,321,443
Patented May 23, 1967

3,321,443
STABILIZED POLYOXYMETHYLENE
Keith Clark Brinker and Carl Earle Schweitzer, Wilmington, Del., assignors to E. I. du Pont de Nemours and Company, Wilmington, Del., a corporation of Delaware
No Drawing. Filed Oct. 16, 1963, Ser. No. 316,518
5 Claims. (Cl. 260—67)

This invention relates to a novel process for preparing stable polyoxymethylene, and, more particularly, it relates to the stabilization of polyoxymethylene having a number average molecular weight of at least 10,000 by reacting a polyoxymethylene with dihydropyran to obtain a polyoxymethylene of substantially the same molecular weight as the starting material. This product has an improved base stability as compared to the untreated polyoxymethylene.

The resistance of polyoxymethylene to various mediums may be improved by esterification of the high molecular weight polyoxymethylene according to the process described in United States Patent 2,964,500, issued Dec. 13, 1960, to S. H. Jenkins et al. However, the polymers treated according to such a process, although exhibiting an improved thermal stability, are not sufficiently base stabled to permit their employment in an extremely basic medium. Copending application Ser. No. 785,136, filed on Jan. 6, 1959, by Northrop Brown et al., now United States Patent 3,192,182, issued June 29, 1965, discloses a process for the preparation of polyoxymethylene ethers to provide a base stable polyoxymethylene.

It has now been discovered that a base stable polyoxymethylene may be prepared by reacting the unstabilized polymer with dihydropyran, and, accordingly, it is an object of this invention to provide a polyoxymethylene stabilized with dihydropyran and a process for preparing such stabilized materials. Other objects will appear hereinafter.

The above objects are accomplished by reacting a polyoxymethylene with dihydropyran represented by the formula

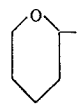

in the presence of an acidic catalyst to produce a mildly acidic reaction medium, and thereafter recovering a polyoxymethylene having improved base stability. More particularly, the above objects are accomplished by reacting one part by weight of a polyoxymethylene starting material, preferably having a hydroxyl group for at least one of the two terminal portions of the polymer chain, and having a number average molecular weight of at least 10,000 with 0.25 to 1000 parts by weight of dihydropyran having the above-mentioned formula in the presence of 0.0025 to 5.0 parts by weight based upon the polymer of a mineral acid, or a compound which gives an acidic reaction, such as a Lewis acid or a Friedel-Crafts catalyst, and thereafter recovering a polyoxymethylene having a molecular weight of at least 10,000.

The polyoxymethylene starting material employed in the process of this invention is a polymer having as a substantial portion of its chain recurring oxymethylene units (—$CH_2O$—) with the chain of the polymer normally terminated at each end by a hydroxyl group, an ether group or an ester group. Preferably, at least one of the two terminal groups of the starting polymer is a hydroxyl group which in turn is reacted with the dihydropyran to produce the final product. Polymers which already contain ether linkages on the ends of the chain are usually base stable and do not normally require treatment by the process of the present invention.

The product of the present invention is believed to have the general formula $$X\text{---}O\text{---}(CH_2O)_n\text{---}Y$$

where X is the number of the class consisting of groups having the formula

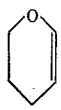

and alkyl groups of 1 to 10 carbon atoms, and Y is a group having the above-mentioned formula; $n$ is a positive integer greater than 300.

Some examples of the acids or acid-reacting compounds may be used as catalysts within the scope of this invention to provide a mildly acidic reaction medium include Lewis acids, usually of the Friedel-Crafts type, such as aluminum trichloride, aluminum tribromide, tin tetrabromide, zinc chloride, boron trifluoride, antimony trichloride, antimony trifluoride, protonic or Bronstead acids with a pK of less than 5.5 including organic carboxylic acids such as adipic acid, formic acid, and glutaric acid, sulfonic acids, such as paratoluene sulfonic, or inorganic acids, such as sulfuric, hydrochloric, and phosphoric acids and the like and phenols having a pK greater than 5.5. The salts of strong acids (pK less than 2.0) with weak bases may also be used. The acid catalyst should be compatible wtih the stabilizing reagent, i.e., should not form insoluble complexes with the reagent in the case of a slurry or solution process, and should not form nonvolatile complexes in the case of a vapor phase process. Strong acids and acids which are strong oxidizing or reducing agents should be used sparingly to prevent excessive degradation of the unreacted polymer by causing the reaction medium to be more than mildly acidic. Excessive degradation may also be avoided by adding these acids in such a manner that the contact time of the acid with the unreacted polymer is held at a minimum. The preferred range of concentration of acid catalysts, excluding phenol and the Lewis acid, is from 0.05 to 3.0 weight percent of the reaction medium, excluding the polymer therein. The same range is preferred for their salts with weak bases. The preferred range of concentration of phenol is 5 to 20 weight percent of the reaction medium and exclusive of the polymer therein. The preferred range of concentration of the Lewis acids is 0.3 to 3.0 weight percent based on the polymer. Generally, boron trifluoride is preferred since it is commercially available. Certain complexes of the aforementioned metal halides may be operable in the present invention, and may be preferred when it is desired to employ a liquid catalyst. Compounds which will complex with these metal halides include tertiary amines and ethers, e.g., trimethylamine, dimethylamine, dimethylstearylamine, dimethylcyclohexyl amine, dimethyl ether, dibutyl ether and dipropyl ether.

The stabilization process of the present invention is not restricted to a narrow range of reaction conditions, but, on the contrary, may be accomplished under a variety of conditions which may be used in the various embodiments of the invention. The stabilization of polyoxymethylenes can be accomplished in any compatible medium in which the polymer can be intimately contacted with the desired stabilization reactant. The medium may be a non-degrading solvent for polyoxymethylene or it may be a nonsolvent which forms a slurry with polyoxymethylene particles or the stabilizing reactant and catalyst may be in the vapor phase, while the polyoxymethylene is present as a solid. Inert gases such as nitrogen and carbon dioxide which are relatively pure may be added as diluents to the vapor in the case where the stabilizing reactant and the catalyst are in the vapor phase, while the polyoxymethylene is present as a solid during the reaction. Solvents for the polyoxymethylene in a solution process may be dimethyl formamide, dixylenol butane, halogenated phenols while nonsolvents may include ethers, hydrocarbons, alkylene and alkyl halides and like compounds which are familiar to skilled chemists. Some of the solvents for the polyoxymethylenes such as phenol will also increase the solubility of the catalyst in the reaction medium and thus allow the use of catalysts which by themselves would not give a commercially satisfactory reaction. The time of reaction may be as long as necessary to reach completion without decomposing too much of the unstabilized polymer, and with long reaction times, temperatures as low as 0° C. or lower may be employed. Temperatures as high as, for example, 200° C., may be employed with short reaction times. The temperature, time and concentration of the reactants, the strength of the catalyst, and efficiency of the stabilization reactant must be balanced so as to cause an acceptable amount of reaction at a reasonable time. The chain of the polymer is susceptible to attack by acids and may be cleaved by such an attack. Therefore, it is important to adjust the reaction temperature and time so that the cleavage and other side reactions that take place are slow and yet the replacement of end groups is fast enough so an acceptable yield is obtained. In the preferred embodiment of the process of the present invention, the reaction temperature is between 50 and 160° C. and the polyoxymethylene is in the solid phase; the dihydropyran is present in the concentration of 0.1 to 10 parts per part of polyoxymethylene and in the vapor phase; and the preferred catalyst, $BF_3$, is present at a concentration of 0.1 to 0.5 part per part of polymer and in the vapor phase. The crude stabilized polymer may possess sufficient thermal stability to be molded without refining; however, in the preparation of molded objects which require extremely thermally stable and base stable polymers, it is desirable to remove all of the unreacted polyoxymethylene. As shown in the following examples, the unreacted polyoxymethylene may be removed by dissolving the unpurified product and heating the solution in the presence of a strong amine or alkali earth to depolymerize the unreacted material. Solvents which may be used in the presence of an amine include aliphatic and aromatic hydroxy compounds such as propanol-2, cyclohexanol, glycol, benzyl alcohol and phenol; and the preferred solvents for the caustic treatment include the above alcohols and also ethers such as trioxymethylene dimethyl ether, and diethylene glycol dimethyl ether. Amines and inorganic bases which are useful in the purification step include triethylamine, tripropylamine, sodium hydroxide, and potassium hydroxide. Another procedure which may be employed for the removal of the unreacted polyoxymethylene is the thermal degradation of the solid or molten polymer or of the polymer in solution, in the absence of an amine or a caustic.

The following examples are presented to illustrate and not to restrict the present invention. Parts and percentages are by weight unless otherwise specified. The molecular weight of the polymers were measured by noting the melt flow characteristics of the particular polymer and may be duplicated by the classical methods of osmometry.

*Example 1*

The starting material for this example was a polyoxymethylene prepared according to the general process disclosed in United States Patent 2,994,687, issued to Goodman et al. on Aug. 1, 1961, having a molecular weight of approximately 48,000. Into a clean, round-bottom flask of approximately 250 ml. in volume were placed 20 grams of the aforementioned polymer, 200 ml. of dihydropyran and 0.06 ml. of concentrated hydrochloric acid. This mixture was permitted to stand for two hours at room temperature under a nitrogen blanket, whereupon the round bottom flask was heated and connected to a standard reflux condenser and the mixture was heated to reflux for a period of one hour. At the termination of the aforementioned period, heat was removed from the flask and the flask was permitted to cool to room temperature, whereupon the treated polymer was recovered by filtration and washed two times, each time with 100 ml. of distilled water following which the polymer was washed several times with acetone. The filter cake was dried at room temperature by suction. The polymer which was recovered amounted to 98.5% of the original 20 grams. In order to determine the amount of material which had been converted to a base stable polymer, the above product along with 50 parts of benzyl alcohol and 2 parts of tri-n-propyl amine were added to a cylindrical glass reactor equipped with a glass frit to retain the slurry, a nitrogen inlet below the frit, and an exit line for gas above the slurry. The reactor was purged thoroughly with nitrogen then placed in a silicone oil bath at 165° C. for one hour, while continuing the nitrogen purge. The polymer dissolved in about one half an hour. The reactor was cooled slowly while continuing the purge to permit the dissolved polymer to precipitate. Subsequently, the mixture was filtered and washed six times with approximately 70 parts of acetone for each washing and dried in a vacuum oven at 70° C. for 16 hours. The base stable polymer which was recovered amounted to 24.0% of the original twenty grams and had a molecular weight of approximately 42,000 which indicates that practically no molecular weight loss was realized by employment of the dihydropyran as a stabilizing agent, whereas a considerable portion of the polymer was converted to a base stable material. The starting material exhibited a base stable fraction of less than 0.5%. Subsequent experiments employing substantially the same ingredients as above confirmed the fact that at least 24% base stable material could be obtained according to the process of the present invention.

*Example 2*

In this example dihydropyran was employed to impart base stability to an unstabilized polymer similar to that used as a starting material in Example 1 employing $BF_3$ as a catalyst. The run was made according to the following procedure. Approximately 2180 grams of polymer, similar to that of Example 1, was charged to a stainless steel, steam-jacketed pipe, three inches in diameter, which was mounted vertically and which was equipped with a gas distributor plate in the lower portion of the pipe, a vapor inlet below the plate and a vapor exit above the plate. After purging the reactor with nitrogen gas, a gaseous mixture consisting of 84% nitrogen, 16% dihydropyran, and 0.003% boron trifluoride was fed upflow through the distributor plate at 25 liters per minute and at a temperature of 150° C. The gas flow maintained the polymer in a fluidized state. Simultaneously, steam was applied to the reactor jacket and held at 72 pounds per square inch. After 10 minutes, the polymer reached 149° C., and was maintained at that temperature for an additional 20 minutes, whereupon the boron trifluoride flow was stopped and the nitrogen-dihydropyran mixture was continued for a 5 minute period. The gas flow was stopped and 2055 grams of polymer were recovered which polymer exhibited a base stability of 12.2% as compared to a starting material having a base stability less than one half of 1.0%. The recovered product exhibited excellent color and there was no evidence of dihydropyran polymerization.

The term "polyoxymethylene" as employed herein refers to polymers prepared by way of several processes for the polymerization of formaldehyde, trioxane, or polymers of the higher aldehydes. These polymers and processes for their preparation are described in part in United States patents:

2,734,889, issued, Feb. 14, 1956, to F. C. Starr, Jr.
2,768,994, issued Oct. 30, 1956, to R. N. MacDonald,
2,795,571, issued June 11, 1957, to Schneidener,
2,828,286, issued Mar. 25, 1958, to R. N. MacDonald,
2,841,570, issued July 1, 1958, to R. N. MacDonald,
2,844,561, issued July 22, 1958, to M. F. Bechtold et al.,
2,848,437, issued Aug. 19, 1958, to W. P. Langsdorf et al.,
2,994,687, issued Aug. 1, 1961, to H. H. Goodman et al.,
3,000,860, issued Sept. 19, 1961, to N. Brown et al.,
3,000,861, issued Sept. 19, 1961, to N. Brown et al., and
S.N. 785,136, filed Jan. 6, 1959, by N. Brown et al., now
United States Patent 3,192,182, issued June 29, 1965.

Included within the term polyoxymethylene for purposes of this application are copolymers containing a predominance of oxymethylene groups and having reactive end groups. The polymers of this invention find widespread utility in the production of film by pressing or extrusion, spinning of fibers, filaments, or bristle material, and in the injection molding of gears and like items. The composition of this invention has remarkable resistance to basic medias and excellent thermal stability.

We claim:
1. A polyoxymethylene which is resistant to basic media having the formula

$$X—O—(CH_2O)_n—Y$$

wherein X is a member of the class consisting of groups having the formula

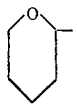

and alkyl groups of 1 to 10 carbon atoms, Y is a group having the formula

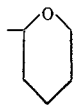

and $n$ is a positive integer greater than 300.

2. A polyoxymethylene tetrahydro-2-pyranyl ether having a molecular weight of at least 10,000.

3. A polyoxymethylene bis(tetrahydro-2-pyranyl) ether having a molecular weight of at least 10,000.

4. A process for stabilizing a polyoxymethylene which comprises reacting in a mildly acidic reaction medium one part by weight of a polyoxymethylene starting material having a molecular weight of at least 10,000 and having 1 to 2 of its terminal valences satisfied by a hydroxyl group with 0.5 to 200 parts of a compound having the formula

at a temperature of 0 to 200° C., and thereafter recovering a polyoxymethylene having improved base stability as compared to said starting material and having a number average molecular weight of at least 10,000.

5. A process for the preparation of a thermally stable polyoxymethylene having improved base stability which comprises reacting one part by weight of a polyoxymethylene starting material having 1 to 2 of its terminal valences satisfied with a hydroxyl group and having a number average molecular weight of at least 10,000 with 0.5 to 200 parts of dihydropyran at a temperature of 0 to 200° C. in an acidic reaction medium, and thereafter recovering a polyoxymethylene tetrahydro-2-pyranyl ether having a number average molecular weight of at least 10,000.

References Cited by the Examiner
UNITED STATES PATENTS

| | | | |
|---|---|---|---|
| 3,087,913 | 4/1963 | Kray et al. | 260—67 |
| 3,154,566 | 10/1964 | Steininger | 260—67 |
| 3,183,211 | 5/1965 | Brinker et al. | 260—67 |

WILLIAM H. SHORT, *Primary Examiner.*

L. M. PHYNES, *Assistant Examiner.*